(12) United States Patent
Wigsten

(10) Patent No.: US 6,375,587 B1
(45) Date of Patent: *Apr. 23, 2002

(54) TIMING CHAIN HAVING MULTIPLE BLADE TENSIONERS CONTACTING THE SAME SECTION OF CHAIN

(75) Inventor: Mark M. Wigsten, Lansing, NY (US)

(73) Assignee: BorgWarner Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/440,022

(22) Filed: Nov. 12, 1999

(51) Int. Cl.⁷ .............................. F16H 7/00; F16H 7/08
(52) U.S. Cl. ..................... 474/111; 474/140; 474/109
(58) Field of Search ................. 474/111, 101, 474/109, 133, 140, 135, 148, 156, 152, 157

(56) References Cited

U.S. PATENT DOCUMENTS

| | | | |
|---|---|---|---|
| 4,921,472 A | 5/1990 | Young | 474/111 |
| 5,045,032 A | 9/1991 | Suzuki et al. | 474/140 |
| 5,055,088 A | 10/1991 | Cradduck et al. | 474/111 |
| 5,266,066 A | 11/1993 | White | 474/111 |
| 5,425,680 A * | 6/1995 | Young | 474/111 |
| 5,462,493 A | 10/1995 | Simpson | 474/111 |
| 5,653,652 A | 8/1997 | Simpson | 474/110 |
| 5,662,540 A | 9/1997 | Schnuepke et al. | 474/111 |
| 5,702,318 A | 12/1997 | Hayafune et al. | 474/111 |
| 5,813,935 A | 9/1998 | Dembosky et al. | 474/111 |
| 5,853,341 A | 12/1998 | Wigsten | 474/140 |
| 5,967,922 A * | 10/1999 | Ullein et al. | 474/111 |
| 5,984,815 A | 11/1999 | Baddaria | 474/111 |
| 6,213,905 B1 * | 4/2001 | White et al. | 474/156 X |

* cited by examiner

Primary Examiner—David A. Bucci
Assistant Examiner—Marcus Charles
(74) Attorney, Agent, or Firm—Fitch, Even, Tabin & Flannery; Greg Dziegielewski

(57) ABSTRACT

A chain drive is provided which includes a chain, a driven sprocket and a drive sprocket. A single portion of the chain is tensioned by two spring tensioners. The spring tensioners can act on a single side of the chain portion or on opposite sides of the chain portion.

9 Claims, 2 Drawing Sheets

TIMING CHAIN HAVING MULTIPLE BLADE TENSIONERS CONTACTING THE SAME SECTION OF CHAIN

SUMMARY OF THE INVENTION

The present invention is directed to an apparatus for applying a tension to a portion of a chain extending between first and second sprockets. The apparatus includes a first spring tensioner for tensioning the portion of the chain and a second spring tensioner for tensioning the portion of the chain. The first and second spring tensioners can tension a first side of the portion of the chain. Alternatively, the first spring tensioner can contact a first side of the portion of the chain while the second spring tensioner contacts an opposite second side of the portion of the chain. The tensioners can replace a hydraulic tensioner and tensioner arm.

DETAILED DESCRIPTION OF TIE INVENTION

Figure 1:
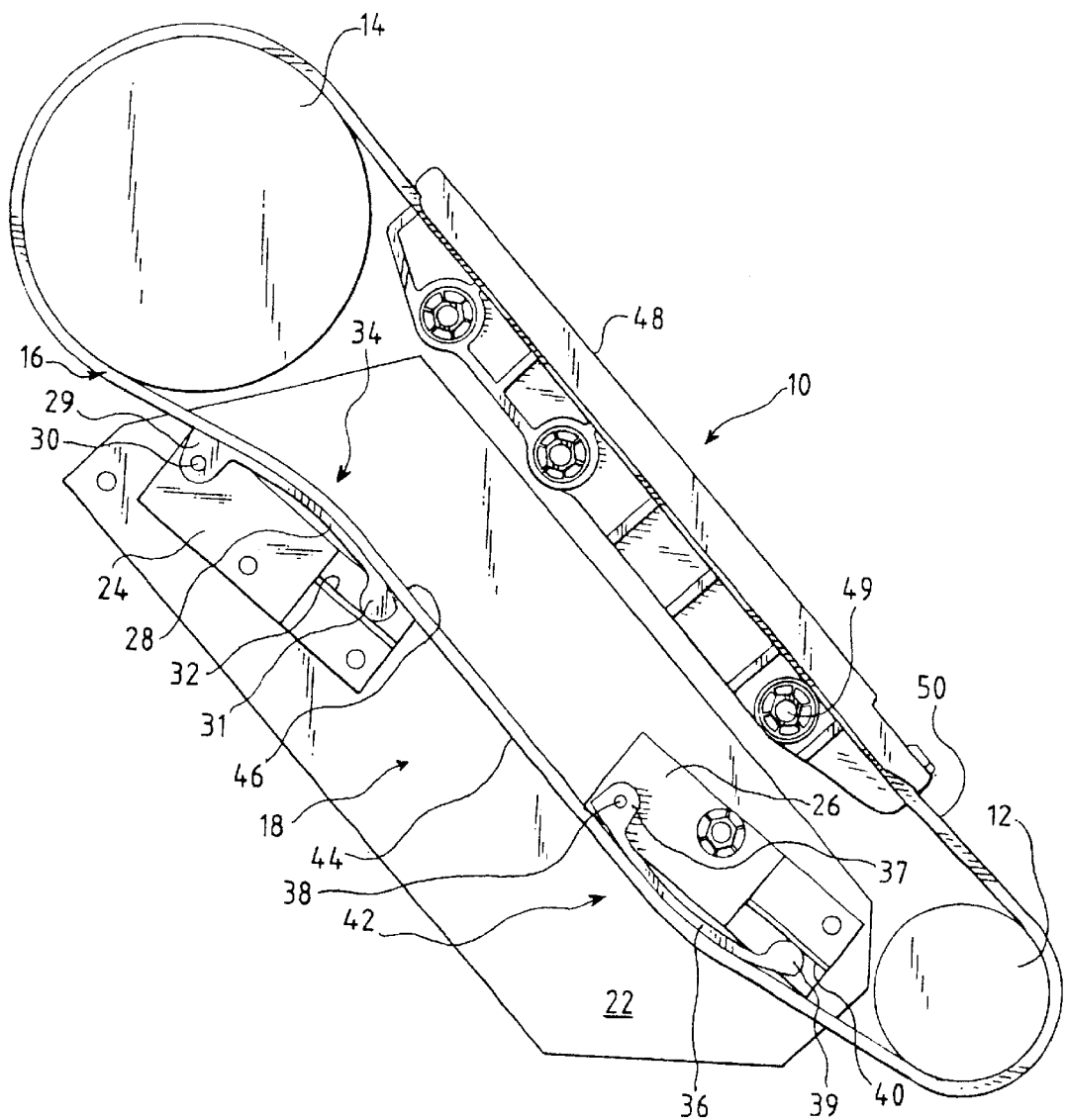
FIG. 1 is a side view of a chain drive apparatus incorporating a first embodiment of the present invention.

With reference to the figures, there is illustrated a chain drive 10 which, for example, can be provided within an internal combustion engine for an automobile. The chain drive 10 includes a drive sprocket 12, a driven sprocket 14 and chain 16 inter-connecting the sprockets 12 and 14. For example, drive sprocket 12 may be a part of a crankshaft in an engine while driven sprocket 14 may be part of a camshaft in an engine.

With reference to FIG. 1, a first embodiment of the present invention will be described. A chain tensioner apparatus 18 is provided which acts on a single portion 20 of the chain 16 extending between the sprockets 12 and 14. The apparatus 18 includes a first bracket 24 and second bracket 26 which are mounted on engine block 22.

A first spring blade tensioner 28 is mounted on the first bracket 24. A first end 29 of the spring blade tensioner 28 is pinned to the first bracket 24 by a pin 30. The opposite end 31 of the spring blade tensioner rests against a stop 32 on the first bracket 24. Alternatively, the pin 30 can pivotally mount end 31, while end 29 is free to move against stop 32 which would be repositioned to face end 29. The first spring blade tensioner 28 is formed with a resilient arch to resiliently bear against the chain 16 along portion 20 to tension the chain. The first bracket 24 and first spring blade tensioner 28 combine to form a first spring blade tensioner assembly 34.

Figure 3:
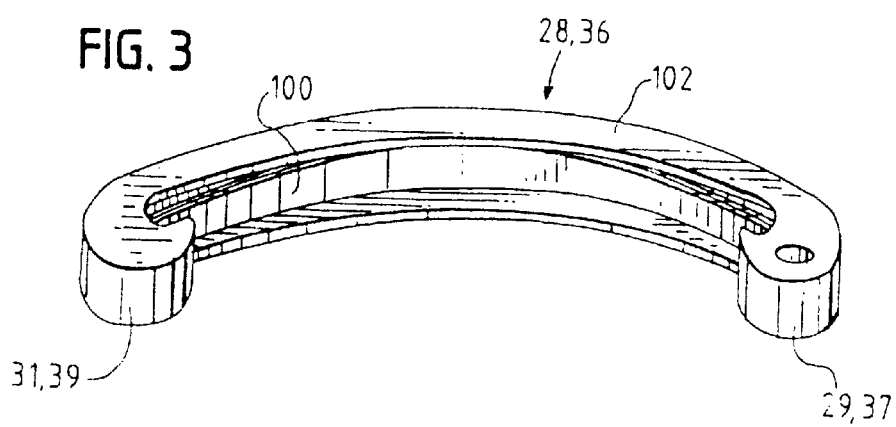
FIG. 3 is a perspective view of a spring blade tensioner.

The first spring blade tensioner 28 uses a blade spring 100 interlocked under tension with a single shoe 102 to provide tension as seen in FIG. 3. The blade spring 100 is arcuate in shape and the shoe 102 is relatively flat. The shoe 102 is constructed from a semi-rigid material which will typically deform or "creep" upon experiencing a load at a higher temperature. The spring blade 100 is initially flattened to correspond to the shape of the shoe 102 and then interlocked with it. Because the semi-rigid shoe 102 prevents the blade spring 100 from returning to its original, more arcuate shape, the blade spring 100 applies a load to the shoe 102. During operation in an engine, as the heat increases, the temperature of the shoe 102 increases and becomes less rigid and the load from the blade spring 100 causes the shoe 102 to deform to a more arcuate shape. U.S. Pat. Nos. 4,921,472 and 5,266,066 disclose examples of spring blade tensioners which can be used to form tensioners 28 and 36. The disclosure of these patents is hereby incorporated by reference herein in their entirety.

Similarly, a second spring blade tensioner 36 is mounted on the second bracket 26. One end 37 of the second spring blade tensioner 36 is pinned to the bracket 26 by pin 38 while the other end 39 is supported on surface 40. Again, second spring blade tensioner 36 has a resilient curvature which forces the blade tensioner against the portion 20 of the chain 16 to assist in tensioning the chain as well. Second spring blade tensioner 36 and second bracket 26 form a second spring blade tensioner assembly 42. Again, pin 38 could be used to pivotally mount either end 37 or 39, with the surface 40 positioned as needed at the free end of the second spring blade tensioner 36.

Similarly, second spring blade tensioner 36 incorporates a spring blade 100 interlocked under tension with a single shoe 102 as seen in FIG. 3.

The brackets 24 and 26 can be combined into a single bracket, if desired, to simplify assembly to the engine.

As can be seen, the first spring tensioner assembly 34 acts on a first side 44 of the portion 20 of the chain 16 while the second spring tensioner assembly 42 acts on the opposite, second side 46 of the portion 20 of the chain 16. A conventional chain guide 48 is mounted on a bracket 49 to contact the portion 50 of the chain 16 on the other side of the sprockets 12 and 14. The bracket 49 for the chain guide can also be combined with the brackets 24 and 26 to again simplify assembly to the engine.

The first spring blade tensioner assembly 34 and second spring blade tensioner assembly 42 each act on the slack side of the chain 16. The chain guide 48 acts on the tight side of the chain. In a chain 16 with a long center distance between sprockets, the slack side requires a great degree of tensioning. The present invention supplies this tensioning without the need to use a hydraulic tensioner. A hydraulic tensioner requires an extending piston, which requires considerable space. In contrast, the present invention, utilizing the first and second spring blade tensioner assemblies 34 and 42 can be made quite compact and requires less space than would be necessary for a hydraulic tensioner.

Figure 2:
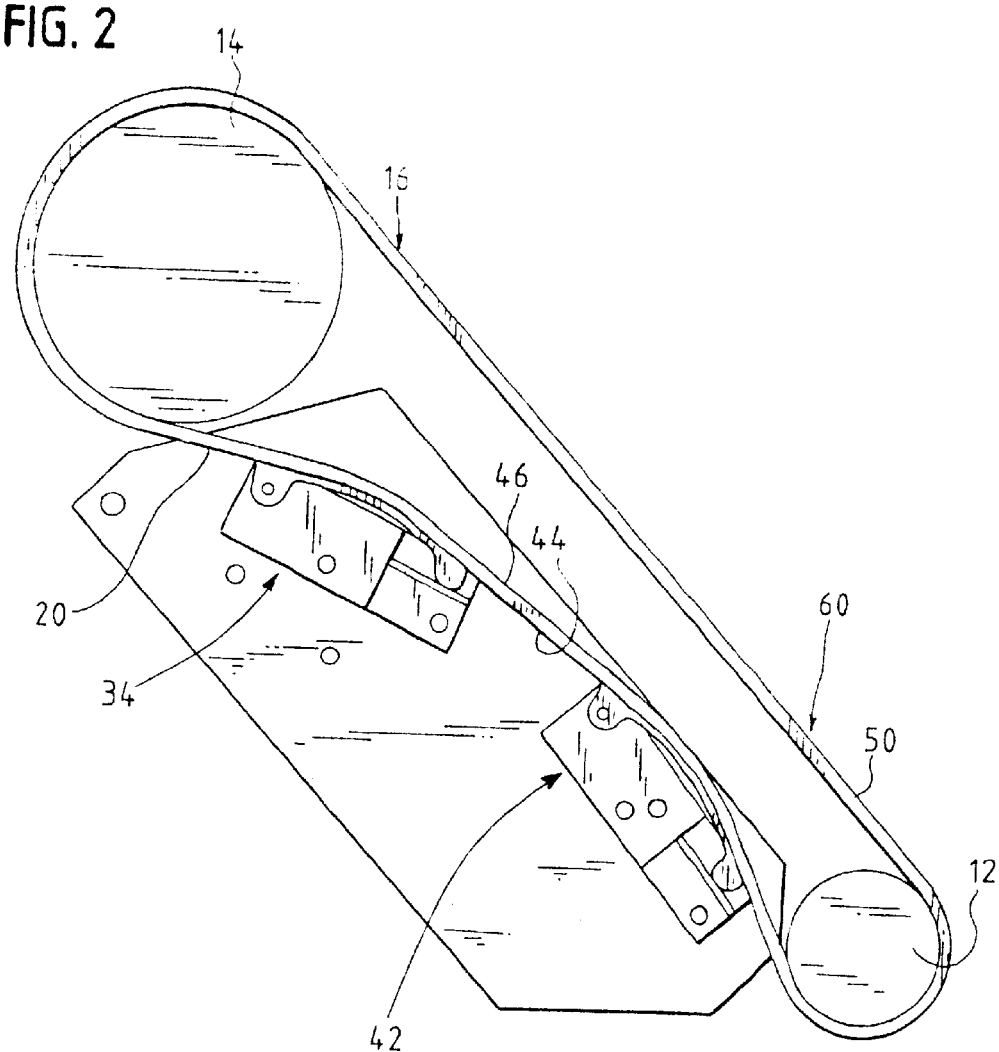
FIG. 2 is a side view of an apparatus incorporating a second embodiment of the present invention.

With reference to FIG. 2, a second embodiment of the present invention will be described and is formed by a chain drive 60. Many of the components of chain drive 60 are identical to those found in chain drive 10, and are identified by the same reference numerals. While drive chain drive 60 utilizes the first spring tensioner assembly 34 and the second spring tensioner assembly 42, the two spring tensioner assemblies act on the same side 44 of the chain 16.

As can be readily understood, the utilization of two spring tensioners, such as spring tensioners 28 and 36, eliminates the need for a hydraulic tensioner and tensioner arm. This can result in a significant savings in materials and assembly costs. In certain circumstances, it may be desirable to use three or more spring tensioners. This may be necessary on long chain strands or strands with a very high chain load. Single blade tensioners are commonly used on relatively short chain strands. Those designs can be readily adapted for the present application. Also, the use of multiple spring in a blade tensioner can be utilized here. Such multiple spring tensioners are disclosed in U.S. Pat. No. 5,055,088, issued Oct. 8, 1991, which disclosure is hereby incorporated by reference in its entirety;

While certain embodiments of the apparatus of the present invention have been presented, it is appreciated that the invention is not limited thereto. Many variations, substitutions and amendments can be made to this embodiment without departing from the scope of the invention. Such variations, substitutions, and amendments as would be apparent to one having ordinary skill in the art who will be familiar with the teachings disclosed herein are also deemed to fall within the scope and the spirit of the present invention as hereinafter claimed.

What is claimed is:

1. An apparatus for applying a tension to a portion of a chain extending between a first sprocket and a second sprocket, the apparatus comprising:
    a first spring tensioner, said first spring tensioner having, a shoe pivotally mounted at a first end and freely mounted at a second end, said shoe having a spring blade contained therein, said first spring tensioner acting on a portion of a chain extending between a first sprocket and a second sprocket without an intervening sprocket along said portion;
    a second spring tensioner spaced apart from and operable independently of said first spring tensioner, said second spring tensioner having a shoe pivotally mounted at a first end and freely mounted at a second end, said shoe having a spring blade contained therein, said second spring tensioner acting on said portion of said chain.

2. The apparatus of claim 1 wherein the first and second spring tensioners act on a first side of said portion of a chain.

3. The apparatus of claim 1 wherein said first spring tensioner acts on a first side portion of a chain and the second spring tensioner acts on an opposite second side portion of a chain.

4. The apparatus of claim 1 wherein said first spring tensioner has multiple resilient springs therein.

5. The apparatus of claim 1 wherein said first spring tensioner has a bracket.

6. The apparatus of claim 1 further comprising a chain guide acting on a second portion of said chain.

7. The apparatus of claim 1 wherein the portion of the chain is the slack side of the chain.

8. The apparatus of claim 1 wherein the first and second spring tensioners tension the portion of the chain without use of a hydraulic tensioner.

9. The apparatus of claim 1 wherein said second end of said shoe of said first spring tensioner is supported by a stop member.

* * * * *